(12) United States Patent
Fujita et al.

(10) Patent No.: US 11,008,485 B2
(45) Date of Patent: May 18, 2021

(54) ADHESIVE COMPOSITION, ADHESIVE LAYER, OPTICAL FILM PROVIDED WITH ADHESIVE LAYER, IMAGE DISPLAY PANEL, AND LIQUID CRYSTAL DISPLAY

(71) Applicant: NITTO DENKO CORPORATION, Ibaraki (JP)

(72) Inventors: Masakuni Fujita, Ibaraki (JP); Satoshi Yamamoto, Ibaraki (JP); Yusuke Toyama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/314,975

(22) PCT Filed: Jul. 6, 2017

(86) PCT No.: PCT/JP2017/024756
§ 371 (c)(1),
(2) Date: Jan. 3, 2019

(87) PCT Pub. No.: WO2018/008712
PCT Pub. Date: Jan. 11, 2018

(65) Prior Publication Data
US 2019/0338167 A1    Nov. 7, 2019

(30) Foreign Application Priority Data
Jul. 8, 2016    (JP) .............. JP2016-136190

(51) Int. Cl.
*C09J 7/38*    (2018.01)
*C09J 11/06*   (2006.01)
(Continued)

(52) U.S. Cl.
CPC .............. *C09J 7/385* (2018.01); *C09J 11/06* (2013.01); *C09J 139/04* (2013.01);
(Continued)

(58) Field of Classification Search
CPC ........ C09J 7/0225; C09J 7/385; C09J 139/04; C09J 11/06; C09J 2203/318;
(Continued)

(56) References Cited

U.S. PATENT DOCUMENTS

2012/0300299 A1*  11/2012  Yasui .................. C09J 7/38
                                              359/483.01
2013/0120314 A1    5/2013  Ishibashi et al.
(Continued)

FOREIGN PATENT DOCUMENTS

CN    104231950 A    12/2014
JP    2013-105154 A   5/2013
(Continued)

OTHER PUBLICATIONS

Office Action dated Jun. 21, 2019, issued in counterpart JP application No. 2018-526430, with English translation. (8 pages).
(Continued)

*Primary Examiner* — Sophie Hon
(74) *Attorney, Agent, or Firm* — Westerman, Hattori, Daniels & Adrian, LLP (57) ABSTRACT

A pressure-sensitive adhesive composition for an image display panel, a pressure-sensitive adhesive layer for an image display panel, and an optical film provided with a pressure-sensitive adhesive layer are disclosed which are free of problems regarding durability and defective appearance caused by an antistatic agent (conductive agent), and which have superior antistatic properties so as to be usable for applications such as in an image display panel. An image display panel is also disclosed in which the optical film provided with a pressure-sensitive adhesive layer is attached to the surface of the image display panel in contact with the pressure-sensitive adhesive layer without an interposed conductive layer, and a liquid crystal display device using the (Continued)

image display panel. Further, a liquid crystal display device is disclosed with a touch sensing function using the image display panel that can be used as various input display devices such as mobile devices.

6 Claims, 1 Drawing Sheet (51) Int. Cl.
  *C09J 139/04* (2006.01)
  *G02F 1/1333* (2006.01)
  *G02F 1/1362* (2006.01)
  *G02F 1/1335* (2006.01)

(52) U.S. Cl.
  CPC .... *G02F 1/13338* (2013.01); *G02F 1/136204* (2013.01); *C09J 2203/318* (2013.01); *C09K 2323/057* (2020.08); *G02F 1/133528* (2013.01); *G02F 2202/023* (2013.01); *G02F 2202/22* (2013.01); *G02F 2202/28* (2013.01)

(58) Field of Classification Search
  CPC ............ C09J 2433/00; G02F 1/136204; G02F 1/13338; G02F 1/133528; G02F 2202/22; G02F 1/023; G02F 1/28; Y10T 428/1077; Y10T 428/31855; B32B 7/12
  See application file for complete search history.

(56) References Cited

U.S. PATENT DOCUMENTS

2014/0302314 A1* 10/2014 Takashima ............. C09J 133/08
  428/355 AC
2014/0363667 A1* 12/2014 Yasui ........................ B32B 7/12
  428/352
2014/0377550 A1  12/2014 Yasui et al.
2017/0022396 A1  1/2017 Kimura et al.

FOREIGN PATENT DOCUMENTS

| | | |
|---|---|---|
| JP | 2014-201719 A | 10/2014 |
| JP | 2014-237785 A | 12/2014 |
| JP | 2015-199942 A | 11/2015 |
| TW | 201542736 A | 11/2015 |
| TW | 201700693 A | 1/2017 |
| WO | 2016/059926 A1 | 4/2016 |
| WO | 2016/163287 A1 | 10/2016 |

OTHER PUBLICATIONS

International Search Report dated Aug. 29, 2017, issued in counterpart International Application No. PCT/JP2017/024756 (2 pages).
Notification of Transmittal of Translation of the International Preliminary Report on Patentability (Form PCT/IB/338) issued in counterpart International Application No. PCT/JP2017/024756 dated Jan. 17, 2019 with Forms PCT/IB/373 and PCT/ISA/237. (8 pages).
Office Action dated May 21, 2020, issued in counterpart CN Application No. 201780041558.6, with English translation (13 pages).
Office Action dated Nov. 9, 2020, issued in counterpart Taiwanese Patent Application No. 106122832 9w/ English translation, 9 pages).

* cited by examiner

ADHESIVE COMPOSITION, ADHESIVE LAYER, OPTICAL FILM PROVIDED WITH ADHESIVE LAYER, IMAGE DISPLAY PANEL, AND LIQUID CRYSTAL DISPLAY

TECHNICAL FIELD

The present invention relates to a pressure-sensitive adhesive composition for an image display panel, a pressure-sensitive adhesive layer for an image display panel, and an optical film provided with a pressure-sensitive adhesive layer. The present invention also relates to an image display panel in which the optical film provided with a pressure-sensitive adhesive layer is attached to the surface of the image display panel in contact with the pressure-sensitive adhesive layer without an interposed conductive layer, and a liquid crystal display device using the image display panel. Further, a liquid crystal display device with a touch sensing function using the image display panel of the present invention can be used as various input display devices such as mobile devices.

BACKGROUND ART

Generally, from the image forming method in liquid crystal display devices, polarizing films are bonded to both sides of a liquid crystal cell with an interposed pressure-sensitive adhesive layer. In addition, ones that mount a touch panel on a display screen of a liquid crystal display device have been put to practical use. As the touch panel, there are various systems such as an electrostatic capacitance type, a resistive film type, an optical type, an ultrasonic type, and an electromagnetic induction type, but an electrostatic capacitance type is increasingly adopted. In recent years, a liquid crystal display device with a touch sensing function that incorporates an electrostatic capacitance sensor as a touch sensor unit is used.

When the polarizing film provided with a pressure-sensitive adhesive layer is adhered to a liquid crystal cell during manufacturing process of a liquid crystal display device, a releasing film is peeled from the pressure-sensitive adhesive layer of the polarizing film provided with a pressure-sensitive adhesive layer, but static electricity is generated by such a release of the releasing film. The static electricity generated in this way affects the orientation of the liquid crystal layer inside the liquid crystal display device and causes defects. Generation of static electricity can be suppressed, for example, by forming an antistatic layer on the outer surface of the polarizing film.

On the other hand, an electrostatic capacitance sensor in the liquid crystal display device with a touch sensing function detects a weak electrostatic capacitance formed by a transparent electrode pattern and a finger when the user's finger approaches the surface. In the case where a conductive layer such as an antistatic layer is provided between the transparent electrode pattern and the user's finger, the electric field between a driving electrode and a sensor electrode is disturbed, the sensor electrode capacitance becomes unstable, and the touch panel sensitivity is reduced to cause malfunction. In the liquid crystal display device with a touch sensing function, it is required to suppress the occurrence of static electricity and suppress the malfunction of the electrostatic capacitance sensor. For example, in order to reduce the occurrence of display defects and malfunctions in a liquid crystal display device with a touch sensing function regarding the above problems, it has been proposed to dispose a polarizing film having an antistatic layer with a surface resistance value of $1.0 \times 10^9$ to $1.0 \times 10^{11} \Omega/\square$ on the viewer side of the liquid crystal layer (Patent Document 1).

PRIOR ART DOCUMENT

Patent Document

Patent Document 1: JP-A-2013-105154

SUMMARY OF THE INVENTION

Problem to be Solved by the Invention

According to the polarizing film having an antistatic layer described in Patent Document 1, generation of static electricity can be suppressed to some extent. However, in Patent Document 1, since the placement position of the antistatic layer is farther than the fundamental position where static electricity is generated, this case is not effective compared with the case where the antistatic function is imparted to the pressure sensitive adhesive layer.

In a liquid crystal display device with a touch sensing function using an in-cell type liquid crystal cell, it was found that conduction from the side can be imparted by providing a conduction structure on the side surface of the polarizing film, but when the antistatic layer is thin, the contact area with the conduction structure on the side surface is small so that sufficient conductivity cannot be obtained and conduction failure occurs. On the other hand, it was found that the sensitivity of the touch sensor decreases as the thickness of the antistatic layer increases.

The pressure-sensitive adhesive layer imparted with the antistatic function is effective for suppressing generation of static electricity and preventing static electricity unevenness more than the antistatic layer provided on the polarizing film. However, it was found that when the conductive function of the pressure-sensitive adhesive layer is enhanced by emphasizing the antistatic function of the pressure-sensitive adhesive layer, the touch sensor sensitivity is lowered. In particular, it was found that the touch sensor sensitivity is lowered in the liquid crystal display device with a touch sensing function using the in-cell type liquid crystal cell. In addition, the antistatic agent (conductive agent) blended in the pressure-sensitive adhesive layer in order to enhance the conductivity function segregates at the interface with the polarizing film under the moist heat environment (after a humidity reliability test) or migrates to the viewing side interface of the liquid crystal cell. Thus, the durability of the antistatic agent was found to be not sufficient.

Further, when a conductive layer is not provided on the panel surface of an in-cell type liquid crystal panel or the like included in the image display panel, the polarizing film is liable to be electrified, and thus high antistatic property (conductivity) is required. Therefore, a large amount of antistatic agent (conductive agent) is blended into the pressure-sensitive adhesive for polarizing films to impart antistatic properties, but by blending a large amount of the antistatic agent, the antistatic agent precipitates on the surface of the pressure-sensitive adhesive layer to cause problems of appearance such as white turbidity in a moist heat environment. Further, foaming or peeling may occur in the pressure-sensitive adhesive layer in a moist heat environment, so that durability problems sometimes occur.

Accordingly, an object of the present invention is to provide a pressure-sensitive adhesive composition, a pressure-sensitive adhesive layer, and an optical film provided with the pressure-sensitive adhesive layer, which are free of problems regarding durability and defective appearance caused by an antistatic agent (conductive agent), and which have superior antistatic properties so as to be usable for applications such as in an image display panel.

Another object of the present invention is to provide an image display panel attached, without an interposed conductive layer, with the optical film provided with a pressure-sensitive adhesive layer, to the surface of the image display panel in contact with the pressure-sensitive adhesive layer, and a liquid crystal display device having the image display panel.

Means for Solving the Problems

As a result of extensive studies to solve the problems, the present inventors have found that the problems can be solved by the following pressure-sensitive adhesive composition for an image display panel and have completed the present invention.

That is, the pressure-sensitive adhesive composition for an image display panel of the present invention comprises an ionic liquid and a (meth)acrylic polymer containing, as a monomer unit, at least one monomer selected from the group consisting of a carboxyl group-containing monomer, an amino group-containing monomer, and an amide group-containing monomer, wherein the amount of the at least one monomer is equal to or more than 1.5% by weight of the total amount of the monomers.

In the pressure-sensitive adhesive composition for an image display panel of the present invention, the (meth)acrylic polymer contains, as a monomer unit, preferably at least two kinds of monomers selected from the group consisting of a carboxyl group-containing monomer, an amino group-containing monomer, and an amide group-containing monomer.

In the pressure-sensitive adhesive composition for an image display panel of the present invention, the ionic liquid is preferably composed of an organic cation and a fluorine-containing imide anion.

The pressure-sensitive adhesive composition for an image display panel of the present invention preferably contains 1.5 to 20 parts by weight of the ionic liquid per 100 parts by weight of the (meth)acrylic polymer.

In the pressure-sensitive adhesive composition for an image display panel of the present invention, it is preferable that the amide group-containing monomer is an N-vinyl group-containing lactam monomer.

The pressure-sensitive adhesive layer for an image display panel according to the present invention is preferably formed from the pressure-sensitive adhesive composition for an image display panel.

In the optical film provided with a pressure-sensitive adhesive layer according to the present invention, it is preferable that the pressure-sensitive adhesive layer for an image display panel is formed on at least one side of the optical film.

In the image display panel of the present invention, the optical film provided with a pressure-sensitive adhesive layer is preferably attached to the surface of the image display panel in contact with the pressure-sensitive adhesive layer without an interposed conductive layer.

The liquid crystal display device of the present invention preferably has the image display panel.

Effect of the Invention

The pressure-sensitive adhesive composition for an image display panel according to the present invention comprises an ionic liquid and a (meth)acrylic polymer obtained by using a specific proportion of a monomer having a specific functional group, whereby a pressure-sensitive adhesive layer for an image display panel and an optical film provided with a pressure-sensitive adhesive layer using the same can be obtained. Thus, such pressure-sensitive adhesive layer and optical film are useful because they are excellent in antistatic property, appearance characteristic, and durability.

Further, it is possible to obtain excellent antistatic properties even when the optical film provided with a pressure-sensitive adhesive layer is attached to the surface of the panel in contact with the pressure-sensitive adhesive layer without an interposed conductive layer, and a liquid crystal display device using such an image display panel can be obtained, and this device is useful.

MODE FOR CARRYING OUT THE INVENTION

Figure 1:
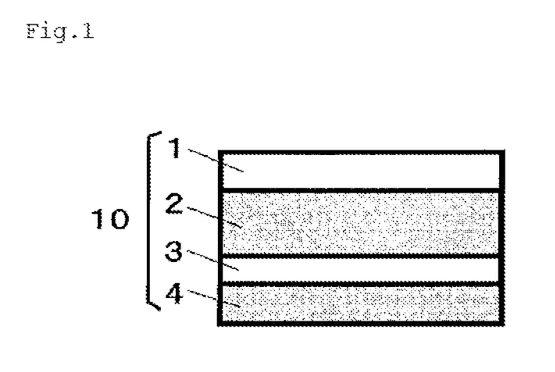
FIG. 1 is a cross-sectional view showing an example of an optical film provided with a pressure-sensitive adhesive layer of the present invention.
Figure 2:
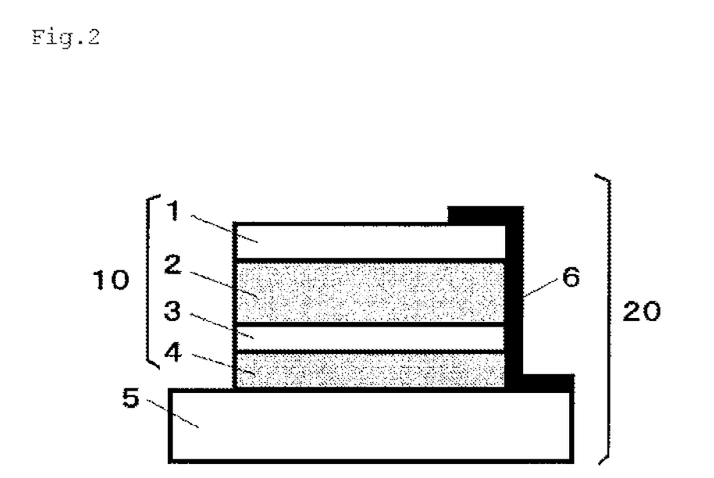
FIG. 2 is a cross-sectional view showing an example of an image display panel (in-cell type liquid crystal panel) of the present invention.

Hereinafter, the present invention will be described with reference to the drawings. As shown in FIG. 1, the optical film provided with a pressure-sensitive adhesive layer of the present invention has a surface treatment layer 1, an optical film (for example, a polarizing film) 2, an anchor layer 3, and a pressure-sensitive adhesive layer 4 in this order. The surface treatment layer 1 and the anchor layer 3 are optional. In the image display panel of the present invention, as shown in FIG. 2, an optical film (for example, a polarizing film) or the like is disposed on the image display panel 5 (for example, an in-cell type liquid crystal panel) with the interposed pressure-sensitive adhesive layer 4, in particular, the surface of the image display panel is disposed on the outermost surface in contact with the pressure-sensitive adhesive layer 4 without interposing a conductive layer. Although not shown in FIG. 1, a separator can be provided on the surface of the pressure-sensitive adhesive layer 4 of a polarizing film 10 provided with a pressure-sensitive adhesive layer, and a surface protective film can be provided on the surface treatment layer 1 (the optical film (polarizing film) 2 in the case of not having the surface treatment layer 1).

The pressure-sensitive adhesive composition for an image display panel of the present invention comprises a (meth)acrylic polymer containing, as a monomer unit, at least one monomer selected from the group consisting of a carboxyl group-containing monomer, an amino group-containing monomer, and an amide group-containing monomer, wherein the amount of the at least one monomer is equal to or more than 1.5% by weight of the total amount of the monomers. By using a (meth)acrylic polymer containing a monomer containing a polar functional group such as a carboxyl group, an amino group, and an amide group as a monomer unit, it becomes easy to hold the antistatic agent (ionic liquid) in the pressure-sensitive adhesive layer, and segregation of the antistatic agent on the surface of the pressure-sensitive adhesive layer can be suppressed, which is a preferred embodiment.

Further, in the pressure-sensitive adhesive composition for an image display panel of the present invention, the (meth)acrylic polymer contains preferably at least two kinds of monomers selected from the group consisting of a carboxyl group-containing monomer, an amino group-containing monomer, and an amide group-containing monomer, and contains more preferably a carboxyl group-containing monomer and an amide group-containing monomer. By using the at least two kinds of monomers in combination, it becomes easier to hold the antistatic agent in the pressure-sensitive adhesive layer, so that segregation of the antistatic agent on the surface of the pressure-sensitive adhesive layer can be suppressed; occurrence of white turbidity under moist heat environment can be prevented; and durability can be improved, which is a preferred embodiment. Especially, inclusion of the carboxyl group-containing monomer and the amide group-containing monomer is a more preferred embodiment, in view of compatibility between improvement of durability and reduction of resistance, and stability of resistance value under moist heat environment.

The pressure-sensitive adhesive composition for an image display panel of the present invention contains a (meth)acrylic polymer as a base polymer. The (meth)acrylic polymer usually contains an alkyl (meth)acrylate as a main component that is a monomer unit. As used herein, the term "(meth)acrylate" means acrylate and/or methacrylate, and "(meth)" in the present invention is used in the same meaning.

As alkyl (meth)acrylate constituting a main skeleton of the (meth)acrylic polymer, a straight or branched chain alkyl group having 1 to 18 carbon atoms can be exemplified. Examples of the alkyl group can include a methyl group, an ethyl group, a propyl group, an isopropyl group, a butyl group, an isobutyl group, an amyl group, a hexyl group, a cyclohexyl group, a heptyl group, a 2-ethylhexyl group, an isooctyl group, a nonyl group, a decyl group, an isodecyl group, a dodecyl group, an isomyristyl group, a lauryl group, a tridecyl group, a pentadecyl group, a hexadecyl group, a heptadecyl group, an octadecyl group, and the like. These can be used singly or in combination of two or more of them. The average number of carbon atoms of these alkyl groups is preferably 3 to 9.

For the (meth)acrylic polymer, a carboxyl group-containing monomer can be used as a monomer unit. The carboxyl group-containing monomer contains a carboxyl group in its structure and is a compound containing a polymerizable unsaturated double bond such as a (meth)acryloyl group and a vinyl group. Specific examples of the carboxyl group-containing monomer include (meth)acrylic acid, carboxyethyl (meth)acrylate, carboxypentyl (meth)acrylate, itaconic acid, maleic acid, fumaric acid, crotonic acid and the like. Among the carboxyl group-containing monomers, acrylic acid is preferable from the viewpoints of copolymerizability, cost, and adhesive properties (adhesive strength and the like).

For the (meth)acrylic polymer, an amino group-containing monomer can be used as a monomer unit. The amino group-containing monomer is a compound containing an amino group in its structure and containing a polymerizable unsaturated double bond such as a (meth)acryloyl group and a vinyl group. Specific examples of the amino group-containing monomer include aminoethyl (meth)acrylate, N,N-dimethylaminoethyl (meth)acrylate, N,N-dimethylaminopropyl (meth)acrylate and the like.

For the (meth)acrylic polymer, an amide group-containing monomer can be used as a monomer unit. The amide group-containing monomer is a compound containing an amide group in its structure and containing a polymerizable unsaturated double bond such as a (meth)acryloyl group and a vinyl group. Specific examples of the amide group-containing monomer include acrylamide monomers such as (meth)acrylamide, N,N-dimethyl(meth)acrylamide, N,N-diethyl(meth)acrylamide, N-isopropylacrylamide, N-methyl (meth)acrylamide, N-butyl(meth)acrylamide, N-hexyl (meth)acrylamide, N-methylol(meth)acrylamide, N-methylol-N-propane(meth)acrylamide, aminomethyl (meth)acrylamide, aminoethyl(meth)acrylamide, mercaptomethyl(meth)acrylamide, and mercaptoethyl(meth)acrylamide; N-acryloyl heterocyclic monomers such as N-(meth) acryloyl morpholine, N-(meth)acryloyl piperidine, and N-(meth)acryloyl pyrrolidine; N-vinyl group-containing lactam monomers such as N-vinyl-pyrrolidone and N-vinyl-ε-caprolactam; and the like. The amide group-containing monomers are preferable in terms of durability and among them, N-vinyl group-containing lactam monomers are particularly preferred.

For the (meth)acrylic polymer, an aromatic ring-containing (meth)acrylate can be further used. The aromatic ring-containing (meth)acrylate is a compound containing an aromatic ring structure in its structure and containing a (meth)acryloyl group. As the aromatic ring, a benzene ring, a naphthalene ring, or a biphenyl ring can be mentioned. The aromatic ring-containing (meth)acrylate satisfies durability and can improve display unevenness due to white voids in the peripheral portion. Specific examples of the aromatic ring-containing (meth)acrylate include those having a benzene ring, such as benzyl (meth)acrylate, phenyl (meth) acrylate, o-phenylphenol (meth)acrylate, phenoxy (meth) acrylate, phenoxyethyl (meth)acrylate, phenoxypropyl (meth)acrylate, phenoxy diethylene glycol (meth)acrylate, ethylene oxide-modified nonylphenol (meth)acrylate, ethylene oxide-modified cresol (meth)acrylate, phenol ethylene oxide-modified (meth)acrylate, 2-hydroxy-3-phenoxypropyl (meth)acrylate, methoxybenzyl (meth)acrylate, chlorobenzyl (meth)acrylate, cresyl (meth)acrylate, and polystyryl (meth)acrylate; those having a naphthalene ring, such as hydroxyethylated β-naphthol acrylate, 2-naphthoethyl (meth)acrylate, 2-naphthoxyethyl acrylate, and 2-(4-methoxy-1-naphthoxy)ethyl (meth)acrylate; and those having a biphenyl ring, such as biphenyl (meth)acrylate. In particular, benzyl (meth)acrylate and phenoxyethyl (meth) acrylate are preferable as the aromatic ring-containing (meth)acrylate from the viewpoints of adhesive properties and durability, and phenoxyethyl (meth)acrylate is particularly preferable.

For the (meth)acrylic polymer, a hydroxyl group-containing monomer can be used. The hydroxyl group-containing monomer is a compound containing a hydroxyl group in its structure and containing a polymerizable unsaturated double bond such as a (meth)acryloyl group and a vinyl group. It is more preferable to use a hydroxyl group-containing (meth) acrylic monomer. Specific examples of the hydroxyl group-containing monomer include hydroxyalkyl (meth)acrylates such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate and 12-hydroxylauryl (meth)acrylate, and (4-hydroxymethylcyclohexyl)-methyl acrylate. Among such hydroxyl group-containing monomers, preferred are 2-hydroxyethyl (meth)acrylate and 4-hydroxybutyl (meth)acrylate, and particularly preferred is 4-hydroxybutyl (meth)acrylate from the viewpoint of durability.

When the pressure-sensitive adhesive composition contains a crosslinking agent, these copolymerizable monomers become a reaction point with the crosslinking agent. In particular, the carboxyl group-containing monomer and the hydroxyl group-containing monomer are rich in reactivity with an intermolecular crosslinking agent. Thus, these monomers are preferably used to improve the resultant pressure-sensitive adhesive layer in cohesive property and heat resistance. The carboxyl group-containing monomer is preferable from the viewpoint of achieving both durability and reworkability, and the hydroxyl group-containing monomer is preferable from the viewpoint of reworkability.

The (meth)acrylic polymer contains a predetermined amount of each monomer as a monomer unit at a weight ratio of all monomers (100% by weight). The weight ratio of the alkyl (meth)acrylate can be set as the balance of monomers other than the alkyl (meth)acrylate, specifically, it is preferably 65% by weight or more, more preferably 70 to 98% by weight. It is preferable to set the weight ratio of the alkyl (meth)acrylate within the above range in order to secure adhesiveness.

In the (meth)acrylic polymer, at least one monomer selected from the group consisting of a carboxyl group-containing monomer, an amino group-containing monomer, and an amide group-containing monomer is used as a monomer unit in an amount of 1.5% by weight or more, preferably 2% by weight or more, more preferably 3% by weight or more, still more preferably 4% by weight or more, with respect to all the monomers. If the weight ratio of the monomer is less than 1.5% by weight and when an ionic compound such as an ionic liquid as an antistatic agent is blended in a large amount, an antistatic agent may be deposited on the surface of the pressure-sensitive adhesive layer, defects in appearance such as white turbidity may occur in a moist heat environment, or problems of durability such as foaming or peeling may occur in a moist heat environment, which is not preferable. In addition, the (meth)acrylic polymer preferably contains, as a monomer unit, at least one monomer selected from the group consisting of a carboxyl group-containing monomer, an amino group-containing monomer, and an amide group-containing monomer in an amount of preferably 35% or less, more preferably 30% by weight or less, still more preferably 25% by weight or less, even still more preferably 20% by weight or less, particularly preferably 10% by weight or less, further particularly preferably 7% by weight or less, and most preferably 5% by weight or less, with respect to all the monomers. When the weight ratio of at least one monomer selected from the group consisting of the carboxyl group-containing monomer, the amino group-containing monomer, and the amide group-containing monomer exceeds 35% by weight, the adhering strength becomes too high, and the reworkability decreases, which is not preferable. In particular, the weight ratio is preferably 10% by weight or less, more preferably 7% by weight or less, and still more preferably 5% by weight or less in order to suppress the adhesive strength from becoming too high. Further, the (meth)acrylic polymer preferably contains, as a monomer unit, at least one monomer selected from the group consisting of a carboxyl group-containing monomer, an amino group-containing monomer, and an amide group-containing monomer in an amount of preferably 1.5 to 35% by weight, more preferably 2 to 30% by weight, still more preferably 3 to 25% by weight, particularly preferably 4 to 20% by weight, of the total amount of the monomers.

The weight ratio of the hydroxyl group-containing monomer is preferably 0.01 to 3% by weight, more preferably 0.02 to 2% by weight, still more preferably 0.05 to 1% by weight, of the total amount (100% by weight) of the (meth)acrylic polymer. When the weight ratio of the hydroxyl group-containing monomer is less than 0.01% by weight, the pressure-sensitive adhesive layer becomes insufficient in crosslinking and may not be able to satisfy the durability and the adhesive properties. On the other hand, when the weight ratio of the hydroxyl group-containing monomer exceeds 3%, the durability of the pressure-sensitive adhesive layer may not be satisfied.

The weight ratio of the aromatic ring-containing (meth)acrylate is preferably 0 to 30% by weight, more preferably 3 to 25% by weight, still more preferably 5 to 20% by weight, of the total amount (100% by weight) of the (meth)acrylic polymer. When the weight ratio of the aromatic ring-containing (meth)acrylate exceeds 30%, the durability may decrease.

It is not necessary for the (meth)acrylic polymer to contain other monomer units, in addition to the monomer unit described above, but for the purpose of improving adhesiveness and heat resistance, one or more copolymerizable monomers having a polymerizable functional group with an unsaturated double bond such as a (meth)acryloyl group or a vinyl group can be introduced by copolymerization.

Specific examples of such copolymerizable monomers include acid anhydride group-containing monomers such as maleic anhydride and itaconic anhydride; caprolactone adducts of acrylic acid; sulfonic acid group-containing monomers such as allylsulfonic acid, 2-(meth)acrylamido-2-methylpropane sulfonic acid, (meth)acrylamidopropane sulfonic acid and sulfopropyl (meth)acrylate; and phosphate group-containing monomers such as 2-hydroxyethyl acryloyl phosphate.

Examples of a monomer usable for the purpose of property modification include alkylaminoalkyl (meth)acrylates such as aminoethyl (meth)acrylate, N,N-dimethylaminoethyl (meth)acrylate and t-butylaminoethyl (meth)acrylate; alkoxyalkyl (meth)acrylates such as methoxyethyl (meth)acrylate and ethoxyethyl (meth)acrylate; succinimide monomers such as N-(meth)acryloyloxymethylene succinimide, N-(meth)acryloyl-6-oxyhexamethylene succinimide, and N-(meth)acryloyl-8-oxyoctamethylene succinimide; maleimide monomers such as N-cyclohexyl maleimide, N-isopropyl maleimide, N-lauryl maleimide, and N-phenyl maleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; and the like.

Further, it is also possible to exemplify the modifying monomers including vinyl monomers such as vinyl acetate and vinyl propionate; cyanoacrylate monomers such as acrylonitrile and methacrylonitrile; epoxy group-containing (meth)acrylates such as glycidyl (meth)acrylate; glycol (meth)acrylates such as polyethylene glycol (meth)acrylate, polypropylene glycol (meth)acrylate, methoxyethylene glycol (meth)acrylate, and methoxypolypropylene glycol (meth)acrylate; (meth)acrylate monomers such as tetrahydrofurfuryl (meth)acrylate, fluorine (meth)acrylate, silicone (meth)acrylate and 2-methoxyethyl acrylate; and the like. Further, it is also possible to exemplify the modifying monomers including isoprene, butadiene, isobutylene, and vinyl ether.

Examples of the copolymerizable monomers other than the above include a silane-based monomer containing a silicon atom. Examples of the silane-based monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, 10-acryloyloxydecyltriethoxysilane, and the like.

As the copolymerizable monomer, it is also possible to use a polyfunctional monomer having two or more unsaturated double bonds of a (meth)acryloyl group, a vinyl group or the like, such as an esterified substance of (meth)acrylic acid and polyalcohol, wherein the esterified substance includes: tripropylene glycol di(meth)acrylate, tetraethylene glycol di(meth)acrylate, 1,6-hexanediol di (meth)acrylate, bisphenol A diglycidyl ether di(meth)acrylate, neopentyl glycol di(meth)acrylate, trimethylolpropane tri(meth)acrylate, pentaerythritol tri(meth)acrylate, pentaerythritol tetra (meth)acrylate, dipentaerythritol penta(meth)acrylate, dipentaerythritol hexa(meth)acrylate, and caprolactone-modified dipentaerythritol hexa(meth)acrylate; and polyester(meth)acrylate, epoxy(meth)acrylate and urethane(meth)acrylate obtained by adding, as the same functional group as that in the monomer component, two or more unsaturated double bonds of a (meth)acryloyl group, a vinyl group or the like, respectively, to polyester, epoxy and urethane as a backbone.

The weight ratio of the copolymerizable monomers is preferably about 0 to 10% by weight, more preferably about 0 to 7% by weight, still more preferably about 0 to 5% by weight, of the total amount (100% by weight) of the (meth) acrylic polymer.

In general, the (meth)acrylic polymer for use has a weight average molecular weight (Mw) of 500,000 to 3,000,000. In consideration of durability, particularly heat resistance, the weight average molecular weight (Mw) is preferably from 1,000,000 to 2,500,000, more preferably from 1,100,000 to 2,000,000. When the weight average molecular weight (Mw) is less than 500,000, it is not preferable from the viewpoint of heat resistance. In addition, when the weight average molecular weight (Mw) is larger than 3,000,000, the pressure-sensitive adhesive tends to be hard, and peeling tends to occur. The weight average molecular weight (Mw) is determined by GPC (gel permeation chromatography) and calculated in terms of polystyrene.

For production of such a (meth)acrylic polymer, known production methods such as solution polymerization, bulk polymerization, emulsion polymerization and various radical polymerization can be appropriately selected. In addition, the obtained (meth)acrylic polymer may be any of a random copolymer, a block copolymer, a graft copolymer and the like.

In the solution polymerization, for example, ethyl acetate, toluene or the like is used as a polymerization solvent. As a specific solution polymerization example, the reaction is carried out usually by adding a polymerization initiator in an inert gas stream such as nitrogen under reaction conditions of about 5 to 30 hours at a temperature of about 50 to 70° C.

The polymerization initiator, the chain transfer agent, the emulsifier and the like used for the radical polymerization are not particularly limited and can be appropriately selected and used. The weight average molecular weight of the (meth)acrylic polymer can be controlled by the amounts of the polymerization initiator and the chain transfer agent to be used as well as the reaction conditions, and the appropriate amount of the (meth)acrylic polymer to be used is adjusted according to the types of these polymerization initiators and chain transfer agents.

<Ionic Liquid>

The pressure-sensitive adhesive composition for an image display panel of the present invention is characterized by containing an ionic liquid. By using the ionic liquid as an antistatic component (conductive agent, antistatic agent), a pressure-sensitive adhesive layer having high antistatic effect can be obtained without impairing the adhesive properties. Although the details of the reason why excellent antistatic properties can be obtained by using an ionic liquid is not clear, the ionic liquid has a lower melting point (melting point of 40° C. or less) than the ordinary solid alkali metal salt or ionic solid, so that it is considered that molecular movement is easy to obtain excellent antistatic performance. In particular, an ionic liquid having a melting point of 40° C. or less (preferably 25° C. or less) is hardly precipitated in a pressure-sensitive adhesive under moist heat environment or during long term storage, and thus excellent appearance and stable antistatic property are obtained.

Since the ionic liquid is in a liquid state at 40° C. or less (preferably 25° C. or less), it can be easily added to, dispersed in, or dissolved in the pressure-sensitive adhesive as compared with the ionic solid. In addition, since the ionic liquid has no vapor pressure (nonvolatile), the ionic liquid has characteristics such that it does not disappear over time and has antistatic properties continuously. Further, since the ionic liquid is also excellent in compatibility with the polymer, poor appearance and the like can be suppressed. Moreover, in ionic solids, segregation (crystals tend to precipitate) on the surface of the pressure-sensitive adhesive layer occurs easily, causing poor appearance (turbidity) and durability, but in the case of ionic liquid, these problems do not occur, and this is a preferred embodiment.

Note that the ionic liquid refers to a molten salt (organic cationic-anion salt) having a melting point of 40° C. or less and exhibiting a liquid state and is preferably a molten salt in a liquid state at room temperature (25° C.) or lower. Further, the "organic cation-anion salt" referred to in the present invention means an organic salt, the cation part of which is composed of an organic substance and the anion part may be an organic substance or an inorganic substance. The "organic cation-anion salt" herein used does not include what is called an ionic solid.

As the ionic liquid, those composed of an organic cation component represented by the following general formulas (A) to (E) and an anion component are preferably used. An ionic liquid having these cations can further improve the antistatic performance.

[Formula 1]

(D)

(E)

$R_a$ in the formula (A) represents a hydrocarbon group having 4 to 20 carbon atoms wherein a part of the hydrocarbon group may be a functional group substituted with a hetero atom, and $R_b$ and $R_c$ are each the same or different hydrogen or a hydrocarbon group having 1 to 16 carbon atoms wherein a part of the hydrocarbon group may be a functional group substituted with a hetero atom, provided that when the nitrogen atom contains a double bond, $R_c$ is absent.

$R_d$ in the formula (B) represents a hydrocarbon group having 2 to 20 carbon atoms, wherein a part of the hydrocarbon group may be a functional group substituted with a hetero atom, $R_e$, $R_f$, and $R_g$ are each the same or different hydrogen or a hydrocarbon group having 1 to 16 carbon atoms wherein a part of the hydrocarbon group may be a functional group substituted with a hetero atom.

$R_h$ in the formula (C) represents a hydrocarbon group having 2 to 20 carbon atoms wherein a part of the hydrocarbon group may be a functional group substituted with a hetero atom, and $R_i$, $R_j$, and $R_k$ are each the same or different hydrogen or a hydrocarbon group having 1 to 16 carbon atoms wherein a part of the hydrocarbon group may be a functional group substituted with a hetero atom.

Z in the formula (D) represents a nitrogen atom, a sulfur atom or a phosphorus atom, $R_l$, $R_m$, $R_n$, and $R_o$ are each the same or different hydrocarbon group having 1 to 20 carbon atoms wherein a part of the hydrocarbon group may be a functional group substituted with a hetero atom, provided that when Z is a sulfur atom, $R_o$ is absent.

$R_p$ in the formula (E) represents a hydrocarbon group having 1 to 18 carbon atoms wherein a part of the hydrocarbon group may be a functional group substituted with a hetero atom.

Examples of the cation represented by the formula (A) include a pyridinium cation, a piperidinium cation, a pyrrolidinium cation, a cation having a pyrroline skeleton, a cation having a pyrrole skeleton, a morpholinium cation, and the like.

Specific examples of the cation represented by the formula (A) include 1-butylpyridinium cation, 1-hexylpyridinium cation, 1-butyl-3-methylpyridinium cation, 1-butyl-3,4-dimethylpyridinium cation, 1-methyl-1-ethylpyrrolidinium cation, 1-methyl-1-hexylpyrrolidinium cation, 1-ethyl-1-hexylpyrrolidinium cation, pyrrolidinium-2-one cation, 1-propylpiperidinium cation, 1-methyl-1-ethylpiperidinium cation, 1-methyl-1-hexylpiperidinium cation, 2-methyl-1-pyrroline cation, 1-ethyl-2-phenylindole cation, 1,2-dimethylindole cation, 1-ethylcarbazole cation, N-ethyl-N-methylmorpholinium cation, and the like.

Examples of the cation represented by the formula (B) include an imidazolium cation, a tetrahydropyrimidinium cation, a dihydropyrimidinium cation, and the like.

Specific examples of the cation represented by the formula (B) include a 1,3-dimethylimidazolium cation, a 1-ethyl-3-methylimidazolium cation, a 1-hexyl-3-methylimidazolium cation, a 1-ocytl-3-methylimidazolium cation, a 1-decyl-3-methylimidazolium cation, a 1-tetradecyl-3-methylimidazolium cation, a 1-(2-methoxyethyl)-3-methylimidazolium cation, a 1,3-dimethyl-1,4,5,6-tetrahydropyrimidinium cation, a 1,2,3-trimethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3,4-tetramethyl-1,6-dihydropyrimidinium cation, and the like.

Examples of the cation represented by the formula (C) include a pyrazolium cation, a pyrazolinium cation, and the like.

Specific examples of the cation represented by the formula (C) include a 1-methylpyrazolium cation, a 3-methylpyrazolium cation, a 1-ethyl-2-methylpyrazolinium cation, a 1-ethyl-2,3,5-trimethylpyrazolium cation, a 1-propyl-2,3,5-trimethylpyrazolium cation, a 1-butyl-2,3,5-trimethylpyrazolium cation, a 1-ethyl-2,3,5-trimethylpyrazolinium cation, a 1-propyl-2,3,5-trimethylpyrazolinium cation, a 1-butyl-2,3,5-trimethylpyrazolinium cation, and the like.

Examples of the cation represented by the formula (D) include a tetraalkylammonium cation, a trialkylsulfonium cation, a tetraalkylphosphonium cation, and derivatives thereof in which a part of the alkyl group is substituted by an alkenyl group, an alkoxyl group, or an epoxy group.

Specific examples of the cation represented by the formula (D) include a tetramethylammonium cation, a tetrabutylammonium cation, a tetrapentylammonium cation, a tetrahexylammonium cation, a triethylmethylammonium cation, a tributylethylammonium cation, a trimethyldecylammonium cation, an N,N-diethyl-N-methyl-N-(2-methoxyethyl)ammonium cation, a glycidyltrimethylammonium cation, a trimethylsulfonium cation, a triethylsulfonium cation, a tributylsulfonium cation, a trihexylsulfonium cation, a diethylmethylsulfonium cation, a dibutylethylsulfonium cation, a dimethyldecylsulfonium cation, a tetramethylphosphonium cation, a tetraethylphosphonium cation, a tetrabutylphosphonium cation, a tetrahexylphosphonium cation, a tetraoctylphosphonium cation, a triethylmethylphosphonium cation, a tributylethylphosphonium cation, a trimethyldecylphosphonium cation, a diallyldimethylammonium cation, a tributyl-(2-methoxyethyl)phosphonium cation, and the like. Among them, there are preferably used asymmetric tetraalkylammonium cations, trialkylsulfonium cations, and tetraalkylphosphonium cations, such as triethylmethylammonium cation, tributylethylammonium cation, trimethyldecylammonium cation, diethylmethylsulfonium cation, dibutylethylsulfonium cation, dimethyldecylsulfonium cation, triethylmethylphosphonium cation, tributylethylphosphonium cation and trimethyldecylphosphonium cation, and an N,N-diethyl-N-methyl-N-(2-methoxyethyl)ammonium cation, a glycidyltrimethylammonium cation, a diallyldimethylammonium cation, an N,N-dimethyl-N-ethyl-N-heptylammonium cation, an N,N-dimethyl-N-ethyl-N-nonylammonium cation, an N,N-dimethyl-N-propyl-N-pentylammonium cation, N,N-dimethyl-N-propyl-N-hexylammonium cation, N,N-dimethyl-N-propyl-N-heptylammonium cation, a trimethylheptylammonium cation, an N,N-diethyl-N-methyl-N-propylammonium cation, an N,N-diethyl-N-methyl-N-pentylammonium cation, an N,N-diethyl-N-methyl-N- heptylammonium cation, an N,N-diethyl-N-propyl-N-pentylammonium cation, a trioctylmethylammonium cation, and N-methyl-N-ethyl-N-propyl-N-pentylammonium cation.

The cation represented by the formula (E) may be, for example, a sulfonium cation or the like. Examples of $R_p$ in the formula (E) include a methyl group, an ethyl group, a propyl group, a butyl group, a hexyl group, an octyl group, a nonyl group, a decyl group, a dodecyl group, a tridecyl group, a tetradecyl group, an octadecyl group, and the like.

On the other hand, any anion component capable of forming an ionic liquid may be used, and examples thereof include $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $C_4F_9SO_3^-$, $(CF_3SO_2)N^-$, $(C_2F_5SO_2)_2N^-$, $(C_3F_7SO_2)_2N^-$, $(C_4F_9SO_2)_2N^-$, $(CF_3SO_2)_3C^-$, $AsF_6^-$, $SbF_6^-$, $NbF_6^-$, $TaF_6^-$, $HF_2^-$, $(CN)_2N^-$, $C_4F_9SO_3^-$, $(C_2F_5SO_2)_2N^-$, $C_3F_7COO^-$, $(CF_3SO_2)(CF_3CO)N^-$, $C_9H_{19}COO^-$, $(CH_3)_2PO_4^-$, $(C_2H_5)_2PO_4^-$, $CH_5H_5OSO_3^-$, $C_6H_{13}OSO_3^-$, $C_8H_{17}OSO_3^-$, $CH_3(OC_2H_4)_2OSO_3^-$, $C_6H_4(CH_3)SO_3^-$, $(C_2F_5)_3PF_3^-$, $CH_3CH(OH)COO^-$, $(FSO_2)_2N^-$, and the like.

As the anion component, an anion represented by the following formula (F) or the like can also be used.

[Formula 2]

(F)

As the anion component, an anion component containing a fluorine atom is particularly preferably used since an ionic liquid having a low melting point can be obtained.

In addition, it is particularly preferable for the ionic liquid to be composed of an organic cation and a fluorine-containing imide anion. Among these, particularly among the organic cation and the fluorine-containing imide anion, it is possible to impart excellent antistatic properties by adding a relatively small amount of an ionic liquid combining a bis(fluorosulfonyl)imide anion, which is advantageous for durability under moist heat environment and is preferable.

Examples of the ionic liquid to be used in the present invention may be appropriately selected from combinations of any of the above cation components and any of the above anion components. Such examples include 1-butylpyridinium tetrafluoroborate, 1-butylpyridinium hexafluorophosphate, 1-butyl-3-methylpyridinium tetrafluoroborate, 1-butyl-3-methylpyridinium bis(trifluoromethanesulfonyl)imide, 1-butyl-3-methylpyridinium bis(pentafluoroethanesulfonyl)imide, 1-hexylpyridinium tetrafluoroborate, 1-methyl-1-hexylpyrrolidinium bis(trifluoromethanesulfonyl)imide, 1-ethyl-1-hexylpyrrolidinium bis(trifluoromethanesulfonyl)imide, 1-propylpiperidinium bis(trifluoromethanesulfonyl)imide, 1-methyl-1-ethylpiperidinium bis(trifluoromethanesulfonyl)imide, 1-methyl-1-hexylpiperidinium bis(trifluoromethanesulfonyl)imide, 1-methyl-1-ethylpyrrolidinium bis(pentafluoroethanesulfonyl)imide, 1-ethyl-1-hexylpyrrolidinium bis(pentafluoroethanesulfonyl)imide, 1-methyl-1-hexylpiperidinium bis(pentafluoroethanesulfonyl)imide, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)methide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 2-methylpyrazolium tetrafluoroborate, 1-ethyl-2,3,5-trimethylpyrazolium bis(trifluoromethanesulfonyl)imide, 1-propyl-2,3,5-trimethylpyrazolium bis(trifluoromethanesulfonyl)imide, 1-butyl-2,3,5-trimethylpyrazolium bis(trifluoromethanesulfonyl)imide, tetrapentylammonium trifluoromethanesulfonate, tetrapentylammonium bis(trifluoromethanesulfonyl)imide, tetrahexylammonium trifluoromethanesulfonate, tetrahexylammonium bis(trifluoromethanesulfonyl)imide, tetraheptylammonium trifluoromethanesulfonate, tetraheptylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl)imide, N,N-diethyl-N-methyl-N-(2-methoxyethyl) ammonium bis(pentafluoroethanesulfonyl)imide, glycidyltrimethylammonium trifluoromethanesulfonate, glycidyltrimethylammonium bis(trifluoromethanesulfonyl)imide, glycidyltrimethylammonium bis(pentafluoroethanesulfonyl)imide, tetraoctylphosphonium trifluoromethanesulfonate, tetraoctylphosphonium bis(trifluoromethanesulfonyl)imide, N,N-dimethyl-N-ethyl-N-butylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, trioctylmethylammonium bis(trifluoromethanesulfonyl)imide, N-methyl-N-ethyl-N-propyl-N-pentylammonium bis(trifluoromethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, N-ethyl-N-methylmorpholinium thiocyanate, 4-ethyl-4-methylmorpholinium methyl carbonate, 1-ethyl-3-methylimidazoliumbis(fluorosulfonyl)imide and the like. These compounds, in particular, 1-ethyl-3-methylimidazolium bis(fluorosulfonyl)imide, can suppress the amount of ionic liquid to a small amount, impart excellent antistatic property, and maintain adhesive properties. This is advantageous for durability in a moist heat environment, which is preferable.

The ionic liquid may be used singly or in combination of two or more kinds thereof.

The amount of ionic liquid contained in the pressure-sensitive adhesive composition for an image display panel of the present invention is preferably 1.5 to 20 parts by weight, more preferably 3 to 18 parts by weight, still more preferably 5 to 16 parts by weight, per 100 parts by weight of the (meth)acrylic polymer. If the amount of the ionic liquid is less than 1.5 parts by weight, the effect of improving the antistatic performance may not be sufficient. On the other hand, there are cases where if the amount of the ionic liquid is more than 20 parts by weight, defects in appearance such as precipitation/segregation and white turbidity of the ionic liquid under moist heat environments as well as foaming/peeling under moist heat environment occur, resulting in insufficient durability. In particular, since the pressure-sensitive adhesive layer used for an image display panel (for example, an in-cell type liquid crystal panel) without an interposed conductive layer is required to have a high antistatic property, the use of the ionic liquid within the above range is a preferred embodiment. Further, from the viewpoints of inhibition of white turbidity (moist clouding) under moist heat environment, adhesive properties (adhering strength) and durability, the amount of the ionic compound used is preferably 10 parts by weight or less, more preferably 7 parts by weight or less, per 100 parts by weight of the (meth)acrylic polymer.

In addition to the ionic liquid, other antistatic agents (conductive agents) can be used as long as the properties of the present invention are not impaired. Examples thereof include materials that can impart antistatic properties, such as alkali metal salts, ionic solids, ionic surfactant series, conductive polymers, conductive fine particles, and the like.

The pressure-sensitive adhesive composition for forming the pressure-sensitive adhesive layer can contain a crosslinking agent corresponding to a base polymer. For example, when a (meth)acrylic polymer is used as the base polymer, an organic crosslinking agent or a polyfunctional metal chelate can be used as the crosslinking agent. As the organic crosslinking agent, an isocyanate-based crosslinking agent, a peroxide-based crosslinking agent, an epoxy-based crosslinking agent, an imine-based crosslinking agent and the like can be mentioned. The polyfunctional metal chelate is a chelate in which a polyvalent metal is covalently or coordinately bonded to an organic compound. As the polyvalent metal atom, there can be mentioned, for example, Al, Cr, Zr, Co, Cu, Fe, Ni, V, Zn, In, Ca, Mg, Mn, Y, Ce, Sr, Ba, Mo, La, Sn, Ti, etc. Examples of the atom in the organic compound to be covalently bonded or coordinately bonded include an oxygen atom and the like, and examples of the organic compound include an alkyl ester, an alcohol compound, a carboxylic acid compound, an ether compound, a ketone compound, and the like. In particular, it is more preferable to use an isocyanate-based crosslinking agent and/or a peroxide-based crosslinking agent as the crosslinking agent, and it is particularly preferable to use an isocyanate-based crosslinking agent and a peroxide-based crosslinking agent in combination. By using the isocyanate-based crosslinking agent, it is possible to take into consideration cohesive force, prevention of peeling in durability test, etc. Also, by using a peroxide-based crosslinking agent, the pressure-sensitive adhesive composition is excellent in the processability, reworkability, crosslinking stability, releasability, and the like.

As the isocyanate-based crosslinking agent, a compound having at least two isocyanate groups can be used. For example, generally known aliphatic polyisocyanates, alicyclic polyisocyanates, aromatic polyisocyanates, etc. used for urethanization reaction can be used.

Examples of the aliphatic polyisocyanate include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, 2,4,4-trimethylhexamethylene diisocyanate, and the like.

Examples of the alicyclic isocyanate include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylylene diisocyanate, and the like.

Examples of the aromatic diisocyanate include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, xylylene diisocyanate, and the like.

Examples of the isocyanate-based crosslinking agent include multimers (such as dimers, trimers, or pentamers) of these diisocyanates, urethane-modified products obtained by reaction of a diisocyanate with a polyhydric alcohol such as trimethylolpropane, urea-modified products, biuret-modified products, allophanate-modified products, isocyanurate-modified products, carbodiimide-modified products, and the like.

As the isocyanate-based crosslinking agent, preferred are an aliphatic polyisocyanate and an aliphatic polyisocyanate-based compound that is a modified product of the aliphatic polyisocyanate. Compared with other isocyanate-based crosslinking agents, the aliphatic polyisocyanate-based compound is more flexible in crosslinking structure, easier to relax stress due to expansion/shrinkage of the optical film, and less likely to peel off in a durability test. In particular, hexamethylene diisocyanate and a modified product thereof are particularly preferable as the aliphatic polyisocyanate-based compound.

Examples of commercially available products of the isocyanate-based crosslinking agent include products with trade names "MILLIONATE MT", "MILLIONATE MTL", "MILLIONATE MR-200", "MILLIONATE MR-400", "CORONATE L", "CORONATE HL" and "CORONATE HX" each manufactured by Nippon Polyurethane Industry Co., Ltd; and products with trade names "TAKENATE D-110N", "TAKENATE D-120N", "TAKENATE D-140N", "TAKENATE D-160N", "TAKENATE D-165N", "TAKENATE D-170HN", "TAKENATE D-178N", "TAKENATE 500", and "TAKENATE 600" each manufactured by Mitsui Chemicals, Inc. These compounds may be used singly or in the form of a mixture of two or more thereof.

As the peroxide, the following peroxide is appropriately usable: a peroxide which is heated or irradiated with light to generate active radical species, thereby advancing the crosslinkage of the base polymer of the pressure-sensitive adhesive composition. A peroxide having a one-minute half-life temperature of 80 to 160° C. is preferably used, and a peroxide having a one-minute half-life temperature of 90 to 140° C. is more preferably used, in consideration of the workability and stability thereof.

Examples of the peroxide include di(2-ethylhexyl) peroxydicarbonate (one-minute half-life temperature: 90.6° C.), di(4-t-butylcyclohexyl) peroxydicarbonate (one-minute half-life temperature: 92.1° C.), di-sec-butyl peroxydicarbonate (one-minute half-life temperature: 92.4° C.), t-butyl peroxyneodecanoate (one-minute half-life temperature: 103.5° C.), t-hexylperoxypivalate (one-minute half-life temperature: 109.1° C.), t-butylperoxypivalate (one-minute half-life temperature: 110.3° C.), dilauroyl peroxide (one-minute half-life temperature: 116.4° C.), di-n-octanoyl peroxide (one-minute half-life temperature: 117.4° C.), 1,1,3,3-tetramethylbutyl peroxy-2-ethylhexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), t-butyl peroxyisobutyrate (one-minute half-life temperature: 136.1° C.), 1,1-di(t-hexylperoxy)cyclohexane (one-minute half-life temperature: 149.2° C.), and the like. Among these examples, preferred are di(4-t-butylcyclohexyl) peroxydicarbonate (one-minute half-life temperature: 92.1° C.), dilauroyl peroxide (one-minute half-life temperature: 116.4° C.), and dibenzoyl peroxide (one-minute half-life temperature: 130.0° C.) since these compounds are excellent, especially in crosslinking reaction efficiency.

As used herein, the term "half-life of a peroxide" means an index representing a decomposition rate of the peroxide, and specifically means a period of time before a remaining amount of the peroxide reaches one-half. A decomposition temperature for obtaining a half-life in an arbitrary time and a half-life time for obtaining a half-life at an arbitrary temperature are described in a manufacturer's catalog or the like, such as "Organic Peroxide Catalog, 9th edition (May 2003)" of NOF Corporation.

As means to measure a decomposition amount of the peroxide remaining after a reaction treatment, measurement using HPLC (high performance liquid chromatography) may be employed. More specifically, for example, the pressure-sensitive adhesive composition after a reaction treatment is collected by about 0.2 g and subjected to shaking extraction at 25° C. and at 120 rpm for 3 hours in a shaking apparatus, while being immersed in 10 ml of ethyl acetate. Then, a resulting extract is statically placed at room temperatures for 3 days. Then, 10 ml of acetonitrile is added thereto, and a resulting mixture is shaken at 25° C. and at 120 rpm for 30 minutes. About 10 µl of an extracted solution obtained by filtration using a membrane filter (0.45 µm) is poured in and analyzed by HPLC. In this way, an amount of the peroxide after the reaction treatment can be obtained.

The usage (total amount) of the crosslinking agent is preferably from 0.01 to 10 parts by weight, more preferably from 0.02 to 3 parts by weight, even more preferably from 0.03 to 1 part by weight, per 100 parts by weight of the (meth)acrylic polymer. When the amount of the crosslinking agent is less than 0.01 parts by weight, the pressure-sensitive adhesive layer becomes insufficiently crosslinked, and durability and adhesive properties may not be satisfied. On the other hand, if the amount is more than 10 parts by weight, the pressure-sensitive adhesive layer becomes too hard and the durability may decrease.

The pressure-sensitive adhesive composition for an image display panel of the present invention may contain a silane coupling agent. The use of a silane coupling agent makes it possible to enhance durability of the pressure-sensitive adhesive layer. Specific examples of the silane coupling agent include epoxy group-containing silane coupling agents, such as 3-glycidoxypropyltrimethoxysilane 3-glycidoxypropyltriethoxysilane, 3-glycidoxypropylmethyldiethoxysilane, and 2-(3,4-epoxycyclohexyl)ethyltrimethoxysilane; amino group-containing silane coupling agents, such as 3-aminopropyltrimethoxysilane, N-2-(aminoethyl)-3-aminopropylmethyldimethoxysilane, 3-triethoxysilyl-N-(1,3-dimethylbutylidene)propylamine, and N-phenyl-γ-aminopropyltrimethoxysilane; (meth)acrylic group-containing silane coupling agents, such as 3-acryloxypropyltrimethoxysilane and 3-methacryloxypropyltriethoxysilane; and isocyanate group-containing silane coupling agents, such as 3-isocyanatepropyltriethoxysilane. Among the exemplified silane coupling agents, an epoxy group-containing silane coupling agent is preferable.

As the silane coupling agent, a silane coupling agent having a plurality of alkoxysilyl groups in the molecule can be used. Specific examples thereof include products X-41-1053, X-41-1059A, X-41-1056, X-41-1805, X-41-1818, X-41-1810, and X-40-2651 manufactured by Shin-Etsu Chemical Co., Ltd. These silane coupling agents each having plural alkoxysilyl groups in the molecule are favorable since they do not vaporize easily and are effective for improving the pressure-sensitive adhesive layer in durability because of having the plural alkoxysilyl groups. The silane coupling agent, which has plural alkoxysilyl groups in the molecule, has preferably an epoxy group in the molecule, more preferably plural epoxy groups in the molecule. Specific examples of the silane coupling agent, which has in the molecule plural alkoxysilyl groups and one or more epoxy groups, include products X-41-1053, X-41-1059 A, and X-41-1056 manufactured by Shin-Etsu Chemical Co., Ltd. Particularly preferred is the product X-41-1056 manufactured by Shin-Etsu Chemical Co., Ltd., in which the proportion of the contained epoxy groups is large. As the silane coupling agent, those having an acetoacetyl group in the molecule can also be used. For example, A-100 manufactured by Soken Chemical & Engineering Co., Ltd. can be mentioned.

These silane coupling agents may be used singly or in the form of a mixture of two or more thereof. The content of the silane coupling agent as a whole is preferably 0.001 to 5 parts by weight, more preferably 0.01 to 1 part by weight, still more preferably 0.02 to 1 part by weight, even still more preferably 0.05 to 0.6 part by weight, per 100 parts by weight of the (meth)acrylic polymer. Such amount is an amount capable of improving durability and maintaining adequate adhering strength to glass and the like.

A polyether compound having a reactive silyl group can be blended in the pressure sensitive adhesive composition for an image display panel of the present invention. The polyether compound is preferable because it can improve reworkability of the pressure-sensitive adhesive composition. As the polyether compound, for example, those disclosed in JP-A-2010-275522 can be used.

<Antioxidant>

The pressure-sensitive adhesive composition for an image display panel of the present invention may contain an antioxidant. By containing the antioxidant, a preferred embodiment is provided as follows: it is possible to inhibit the main chain of the (meth)acrylic polymer from being cut due to the oxidative deterioration of the obtained pressure-sensitive adhesive layer and maintain low shrinkability even under a heating/humidifying environment. In particular, such a composition containing an antioxidant is useful because it is also excellent in durability due to foaming and peeling under a heating/humidifying environment, compared with the composition not containing an antioxidant but containing a crosslinking agent.

As the antioxidant, phenol-based, phosphorus-based, sulfur-based and amine-based antioxidants can be mentioned, and at least one member selected from these can be used. Of these, phenolic-based antioxidants are preferred.

The amount of the antioxidant to be used is preferably 0.005 to 5 parts by weight, more preferably 0.1 to 4 parts by weight, per 100 parts by weight of the (meth)acrylic polymer. If the amount of the antioxidant is less than 0.005 parts by weight, oxidation degradation of the pressure-sensitive adhesive layer may not be suppressed, and the low shrinkage property and durability may not be satisfied. On the other hand, when the amount is more than 5 parts by weight, for example, when a peroxide-based crosslinking agent is used, crosslinking inhibition due to the antioxidant occurs, so that the heating durability becomes poor and foaming tends to occur, or low shrinkage may not be maintained.

The pressure-sensitive adhesive composition for an image display panel of the present invention may further contain other known additives. For example, the following may be appropriately added to the composition in accordance with the usage thereof: a polyether compound of a polyalkylene glycol, such as polypropylene glycol, a colorant, a powder such as pigment, a dye, a surfactant, a plasticizer, a tackifier, a surface lubricant, a levelling agent, a softener, an antioxidant, a light stabilizer, an ultraviolet absorbent, a polymerization inhibitor, an inorganic or organic filler, a metallic powder, a particle- or foil-form material, and the like. A redox system to which a reductant is added may be adopted as far as the system can be controlled. It is preferred to use these additives in an amount that is preferably 5 parts by weight or less, more preferably 3 parts by weight or less, still more preferably 1 part by weight or less, per 100 parts by weight of the (meth)acrylic polymer.

<Pressure-Sensitive Adhesive Layer and Optical Film Provided with Pressure-Sensitive Adhesive Layer>

The pressure-sensitive adhesive layer for an image display panel of the present invention is preferably formed from the pressure-sensitive adhesive composition for an image display panel. In forming the pressure-sensitive adhesive layer from the pressure-sensitive adhesive composition, it is preferable to sufficiently consider the influence of the crosslinking treatment temperature and the crosslinking treatment time as well as to adjust the amount of the entire crosslinking agent to be used.

The crosslinking temperature and the crosslinking treatment time can be adjusted depending on the crosslinking agent to be used. The crosslinking treatment temperature is preferably 170° C. or less.

The crosslinking treatment may be carried out at the temperature of the drying step of the pressure-sensitive adhesive layer or may be carried out by providing a separate crosslinking treatment step after the drying step.

Regarding the crosslinking treatment time, it can be set in consideration of productivity and workability, but it is usually about 0.2 to 20 minutes, preferably about 0.5 to 10 minutes.

In the optical film provided with a pressure-sensitive adhesive layer according to the present invention, it is preferable that the pressure-sensitive adhesive layer for an image display panel is formed on at least one side of the optical film. The method for forming the pressure-sensitive adhesive layer is, for example, a method of applying the pressure-sensitive adhesive composition onto a separator subjected to release treatment, drying the separator to remove a polymerizing solvent and others therein to form a pressure-sensitive adhesive layer, and then transferring the pressure-sensitive adhesive layer onto an optical film; or a method of applying the pressure-sensitive-adhesive composition onto an optical film and drying the film to remove a polymerizing solvent and others therein to form a pressure-sensitive adhesive layer onto the optical film. In the application of the pressure-sensitive adhesive, one or more solvents other than the polymerizing solvent may be newly added appropriately to the pressure-sensitive adhesive.

As the separator subjected to a release treatment, a silicone release liner is preferably used. In the step of applying the pressure-sensitive adhesive composition of the present invention onto such a liner and drying it to form the pressure-sensitive adhesive layer, an appropriate method is suitably adopted as a method of drying the pressure-sensitive adhesive according to the purpose. Preferably, a method of heating and drying the applied film is used. The heating and drying temperature is preferably 40° C. to 200° C., more preferably 50° C. to 180° C., particularly preferably 70° C. to 170° C. When the heating temperature is set within the above range, a pressure-sensitive adhesive having excellent adhesive properties can be obtained.

Appropriate time may be adopted as appropriate for drying time. The drying time is preferably 5 seconds to 20 minutes, more preferably 5 seconds to 10 minutes, particularly preferably 10 seconds to 5 minutes.

In addition, a pressure-sensitive adhesive layer can be formed after forming an anchor layer or a surface treatment layer on the surface of the optical film or after performing various easy adhesion treatments such as corona treatment and plasma treatment. In addition, easy adhesion treatment may be performed on the surface of the pressure-sensitive adhesive layer.

As a method for forming the pressure-sensitive adhesive layer, various methods are used. Specific examples thereof include roll coating, kiss roll coating, gravure coating, reverse coating, roll brushing, spray coating, dip roll coating, bar coating, knife coating, air knife coating, curtain coating, lip coating, and extrusion coating using a die coater or the like.

The thickness of the pressure-sensitive adhesive layer is not particularly limited. For example, as shown in FIG. 2, it is preferably 5 to 100 μm, more preferably 5 to 50 μm, still more preferably 10 to 35 μm, from the viewpoint of ensuring the durability and ensuring the contact area with the side conduction structure (conductive paste).

The surface resistance value of the pressure-sensitive adhesive layer is preferably $1 \times 10^8$ to $1 \times 10^{11} \Omega/\square$, more preferably $2 \times 10^8$ to $5 \times 10^{10} \Omega/\square$, still more preferably $4 \times 10^8$ to $1 \times 10^{10} \Omega/\square$, from the viewpoint of antistatic function and touch sensor sensitivity.

When the pressure-sensitive adhesive layer is exposed, the pressure-sensitive adhesive layer may be protected with a release-treated sheet (separator) until it is put into practical use.

Examples of a material component of the separator include: a plastic film such as a polyethylene, polypropylene, polyethylene terephthalate, and polyester film; a porous material such as paper, cloth, and nonwoven fabric; and an appropriate thin sheet body such as net, foamed sheet, metal foil, and laminate thereof. From the viewpoint of excellent surface smoothness, a plastic film is suitably used.

The plastic film is not particularly limited as long as it is a film capable of protecting the pressure-sensitive adhesive layer. Examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, an ethylene-vinyl acetate copolymer film, and the like.

The thickness of the separator is generally about 5 to 200 µm, preferably about 5 to 100 µm. If necessary, the separator may be subjected to release treatment and antifouling treatment using a silicone-based, fluorine-based, long-chain alkyl-based or fatty acid amide-based release agent, a silica powder or the like, or may be subjected to an antistatic treatment such as an application type treatment, a kneading type treatment, a vapor deposition type treatment, or the like. In particular, peelability from the pressure-sensitive adhesive layer can be further enhanced by appropriately performing a release treatment such as silicone treatment, long chain alkyl treatment, fluorine treatment or the like on the surface of the separator.

The release-treated sheet used for preparing the optical film provided with a pressure-sensitive adhesive layer can be used as it is as a separator for an optical film provided with a pressure-sensitive adhesive layer, which can simplify the process.

Hereinafter, the optical film provided with a pressure-sensitive adhesive layer of the present invention will be described. The optical film provided with a pressure-sensitive adhesive layer has an optical film (for example, a polarizing film) and a pressure-sensitive adhesive layer in this order. Further, as shown in FIG. 1 and FIG. 2, a surface treatment layer 1 and an anchor layer 3 may be provided.

<Optical Film>

As the optical film, a material used for forming an image display device such as a liquid crystal display device or the like is used, and its type is not particularly limited. For example, as the optical film, a polarizing film can be mentioned. A polarizing film having a transparent protective film on one side or both sides of a polarizer is generally used.

The polarizer is not particularly limited, and various types of polarizers can be used. Examples of the polarizer include a product yielded by allowing a dichroic substance, such as iodine or a dichroic dye, to be adsorbed onto a hydrophilic polymer film, such as a polyvinyl alcohol-based film, a partially formylated polyvinyl alcohol-based film or an ethylene/vinyl acetate copolymer-based partially-saponified film, and then stretching the product uniaxially; and a polyene-based aligned film made of, for example, a dehydrated product of polyvinyl alcohol or a dehydrochlorinated product of polyvinyl chloride. Among such polarizers, preferred is a polarizer composed of a polyvinyl alcohol-based film and a dichroic substance such as iodine. The thickness of these polarizers is not particularly limited, but generally about 80 µm or less.

The polarizer yielded by dyeing a polyvinyl alcohol-based film with iodine and then stretching the dyed film uniaxially may be prepared, for example, by immersing a polyvinyl alcohol film into an aqueous solution of iodine to dye the polyvinyl alcohol, and then stretching the film into a length 3 to 7 times the original length. The polyvinyl alcohol film may be immersed into, for example, an aqueous solution of potassium iodide that may optionally contain, for example, boric acid, zinc sulfate zinc chloride, and the like. Further, before the dyeing, the polyvinyl alcohol film may be optionally immersed into water to be washed therewith. The washing of the polyvinyl alcohol film with water makes it possible to clean away stains and an anti-blocking agent on the surface of the polyvinyl alcohol film. Furthermore, the polyvinyl alcohol film is swollen by such washing to produce an advantageous effect of preventing unevenness such as unevenness of dyeing or some other unevenness. After or while dyed with iodine, the film may be stretched. Alternatively, after stretched, the film may be dyed with iodine. The stretching may be performed in an aqueous solution of, for example, boric acid or potassium iodide, or in a water bath.

As the polarizer, a thin polarizer having a thickness of 10 µm or less can be used. From the viewpoint of thinning, the thickness is preferably 1 to 7 µm. Such a thinned polarizer is preferable because it has less thickness unevenness, is excellent in visibility and superior in durability based on less dimensional changes and is capable of facilitating thickness reduction of the polarizing film.

Typical examples of a thinned polarizer may include thinned polarizer films described in JP-A-51-069644, JP-A-2000-338329, WO-A-2010/100917 pamphlet, PCT/JP2010/001460, JP-A-2010-269002, and JP-A-2010-263692. These thinned polarizer films can be obtained by a production method comprising the steps of: stretching a polyvinyl alcohol-based resin (hereinafter also referred to as "PVA-based resin") layer and a stretching resin substrate in the form of a laminate; and dyeing the stretched PVA-based resin. In this production method, the PVA-based resin layer is supported by the stretching resin substrate, so that it becomes possible to stretch the PVA-based resin layer without any problem such as breakage due to stretching, even when the resin layer is significantly thin.

From a viewpoint of being able to be stretched at a high ratio to thereby enhance polarization performance, a thinned polarizer film obtained by, among the production methods each comprising performing stretching and dyeing steps in a state of the laminate, a production method comprising a step of performing stretching in an aqueous boric acid solution as described in WO-A-2010/100917 pamphlet, PCT/JP2010/001460, JP-A-2010-269002, and JP-A-2010-263692 is preferable, and a thinned polarizer film obtained by a production method comprising a step of performing auxiliary in-air stretching before the stretching in an aqueous boric acid solution as described in JP-A-2010-269002 and JP-A-2010-263692 is especially preferable.

As a material forming the transparent protective film, for example, a thermoplastic resin excellent in transparency, mechanical strength, thermal stability, moisture blocking property, isotropy and the like is used. Examples of the thermoplastic resin include: cellulose resins such as triacetylcellulose; polyester resins; polyethersulfone resins; polysulfone resins; polycarbonate resins; polyamide resins; polyimide resins; polyolefin resins; (meth)acrylic resins; cyclic polyolefin resins (norbornene resins); polyarylate resins; polystyrene resins; polyvinyl alcohol resins; and mixtures thereof. The transparent protective film may be laminated to one side of the polarizer with use of an adhesive layer. In this case, a thermosetting resin or an ultraviolet-curable resin such as a (meth)acryl-based, urethane-based, acrylic urethane-based, epoxy-based, or silicone-based resin may be employed as a transparent protective film for the other side. The transparent protective film may contain one or more optional suitable additives. Examples of the additive include an ultraviolet absorber, an antioxidant, a lubricant, a plasticizer, a release agent, an anti-discoloration agent, a flame retardant, a nucleating agent, an antistatic agent, a pigment, a colorant, and the like. The thermoplastic resin is preferably contained in the transparent protective film in an amount of 50 to 100% by weight, more preferably 50 to 99% by weight, still more preferably 60 to 98% by weight, particularly preferably 70 to 97% by weight. When the content of the thermoplastic resin in the transparent protective film is 50% by weight or less, high transparency and the like inherent in the thermoplastic resin may not be sufficiently exhibited.

The adhesive used to bond the polarizer and the transparent protective film to each other is not particularly limited as long as the adhesive is optically transparent. The adhesive may be in various forms or of various types, such as water-based, solvent-based, hot-melt, radical curable, and cation curable forms or types, but a water-based adhesive or a radical-curable adhesive is preferable.

The optical film includes, for example, an optical layer for use in forming a liquid crystal display device or the like, such as a reflective plate, a transflective plate, a retardation film (including wave plates such as a ½ or ¼ wave plate), a visual compensation film, or a brightness enhancement film. In addition to being usable as an optical film by itself, these optical films can be used in two or more layers laminated on the polarizing film in practical use.

The optical film in which the optical layer is laminated on the polarizing film can also be formed by a method in which the optical film is laminated one by one sequentially in the process of manufacturing the liquid crystal display device and the like. However, an optical film preliminarily formed in the form of a laminate is excellent from the viewpoint of quality stability and assemblability and therefore has an advantage of being able to improve the production process of a liquid crystal display device or the like. For lamination, an appropriate adhesive means such as a pressure-sensitive adhesive layer can be used. Upon bonding of the polarizing film and another optical layer, their optic axes can be appropriately arranged to an arrangement angle, depending on an intended retardation characteristic or the like.

The optical film provided with a pressure-sensitive adhesive layer of the present invention can be preferably used for forming various image display devices such as a liquid crystal display device. The formation of the liquid crystal display device can be carried out according to the conventional method. That is, a liquid crystal display device may be typically formed by appropriately assembling a display panel such as a liquid crystal cell, an optical film provided with a pressure-sensitive adhesive layer, and an optional component such as a lighting system, together, and then incorporating a drive circuit thereto. In the present invention, there is no particular limitation except that the optical film provided with a pressure-sensitive adhesive layer according to the present invention is used, and the present invention can be based on the conventional methods. Any type of liquid crystal cell may be used, for example, TN type, STN type, π type, VA type, IPS type, and the like.

There can be formed any type of liquid crystal display device, such as a liquid crystal display device in which the optical film provided with a pressure-sensitive adhesive layer is disposed on one side or both sides of a display panel such as the liquid crystal cell, and an appropriate liquid crystal display device in which a backlight or a reflection plate is used in an lighting system. In that case, the optical film provided with a pressure-sensitive adhesive layer according to the present invention can be disposed on one side or both sides of a display panel such as a liquid crystal cell. When optical films are provided on both sides of the display panel, they may be the same with or different from each other. Further, in forming the liquid crystal display device, one or more layers of appropriate components, such as a diffusion layer, an antiglare layer, an antireflection film, a protection plate, a prism array, a lens array sheet, a light diffusion sheet, and a backlight, may be arranged at an appropriate position.

<Anchor Layer>

The anchor layer can be formed from various antistatic agent compositions, and a conductive polymer can be used as the antistatic agent for forming the anchor layer.

<Surface Treatment Layer>

The surface treatment layer may be provided on the side of the polarizing film on which the anchor layer is not provided. The surface treatment layer can be provided on the transparent protective film used for the polarizing film or can be provided separately from the transparent protective film. As the surface treatment layer, a hard coat layer, an antiglare treatment layer, an antireflection layer, a sticking prevention layer, and the like can be provided.

The surface treatment layer is preferably a hard coat layer. As a material for forming the hard coat layer, for example, a thermoplastic resin, and a material which is cured by heat or radiation can be used. Examples of the material include a radiation curable resin such as a thermosetting resin, an ultraviolet curable resin, and an electron beam curable resin. Among them, an ultraviolet curable resin capable of efficiently forming a cured resin layer by a simple processing operation by curing treatment with ultraviolet irradiation is suitable. Examples of these curable resins include various types such as polyester-based, acry-based, urethane-based, amide-based, silicone-based, epoxy-based, melamine-based, and the like, and their monomers, oligomers, polymers and the like are included. In particular, a radiation curable resin, particularly an ultraviolet curable resin is preferable because of its high processing speed and low heat damage to the substrate. Preferable examples of the ultraviolet curable resin to be used include those having an ultraviolet polymerizable functional group, particularly those containing an acrylic monomer or oligomer component having 2 or more, especially 3 to 6, functional groups. In addition, a photopolymerization initiator is blended in the ultraviolet curable resin.

In addition, as the surface treatment layer, an antiglare treatment layer or an antireflection layer for the purpose of improving visibility can be provided. An antiglare layer or an antireflection layer may be provided on the hard coat layer. The constituent material of the antiglare treatment layer is not particularly limited, and for example, a radiation curable resin, a thermosetting resin, a thermoplastic resin, or the like can be used. As the antireflection layer, titanium oxide, zirconium oxide, silicon oxide, magnesium fluoride or the like is used. Multiple layers can be provided for the antireflection layer. Other examples of the surface treatment layer include a sticking prevention layer and the like.

Conductivity can be imparted to the surface-treated layer by incorporating an antistatic agent. As the antistatic agent, those exemplified above can be used.

<Other Layers>

In the optical film provided with a pressure-sensitive adhesive layer of the present invention, in addition to each of the above-mentioned layers, an easy-adhesion layer may be provided on the surface of the optical film (polarizing film) on which the anchor layer is provided, or the surface of the optical film can be subjected to various easy adhesion treatments such as corona treatment and plasma treatment.

In the optical film provided with a pressure-sensitive adhesive layer of the present invention, the 180° peeling adhering strength to a glass plate is preferably 2 N/25 mm or more, more preferably 2 to 10 N/25 mm, still more preferably 2 to 6 N/25 mm. When the adhesive force is less than 2 N/25 mm, durability against foaming and peeling under moist heat environment is deteriorated due to insufficient tackiness, and when the adhesive force is 10 N/25 mm or more, reworkability is lowered, which is not preferable.

<Image Display Panel>

Generally, for in-cell liquid crystal cells, there exist a type having a conductive layer on a liquid crystal cell (semi-in-cell type) and a type having no conductive layer (full-in-cell type). The semi-in-cell type has a patterned conductive layer (for example, ITO layer) but in the full-in-cell type, instead of having a conductive layer on the liquid crystal cell, a polarizing plate side (pressure sensitive adhesive layer etc.) having a conductive layer contributes to antistatic properties. The present invention is a full-in-cell type image display panel (in particular, an in-cell liquid crystal panel) having the pressure-sensitive adhesive layer provided with an optical film without having a conductive layer (without an interposed conductive layer), and this is a preferable embodiment. However, even in a semi-in-cell type, such a type can be suitably used for a panel having an overcoat layer or the like on a conductive layer and having poor antistatic properties.

As shown in FIG. 2, an image display panel 20 (for example, an in-cell type liquid crystal panel) in the present invention has at least an optical film 10 provided with a pressure-sensitive adhesive layer on the surface of an image display panel 5 (an in-cell type liquid crystal panel) and is arranged with a pressure-sensitive adhesive layer 4 interposed therebetween without interposing a conductive layer.

In the in-cell type liquid crystal panel 20, a conductive structure 6 can be provided on the side surface of the polarizing film 10 provided with a pressure-sensitive adhesive layer comprising the surface treatment layer 1, the optical film (polarizing film) 2, the anchor layer 3 and the pressure-sensitive adhesive layer 4 (hereinafter referred to as "optical film (polarizing film) etc.". The conduction structure 6 may be provided on the entire side surface of the optical film (polarizing film) etc. or may be provided in a part thereof.

With the conduction structure 6, it is possible to suppress the generation of static electricity by connecting a potential from the side surface of the optical film (polarizing film) or the like to another suitable portion. As the material for forming the conduction structure 6, for example, a conductive paste such as silver, gold or another metal paste can be mentioned, and a conductive adhesive or any other suitable conductive materials can be used. The conduction structure 6 can also be formed in a line shape extending from the side surface of the optical film (polarizing film) or the like.

Further, the in-cell type liquid crystal panel 20 may have an optical film (polarizing film), a pressure-sensitive adhesive layer, or the like on the side opposite to the optical film provided with a pressure-sensitive adhesive layer.

<Liquid Crystal Display Device>

The liquid crystal display device of the present invention preferably has the image display panel. A liquid crystal display device incorporating a touch sensing function using the image display panel (in particular, an in-cell type liquid crystal panel) can appropriately use a member for forming a liquid crystal display device, such as a member using a backlight or a reflecting plate in an lighting system. In particular, since the pressure-sensitive adhesive composition for an image display panel of the present invention is used, there is no problem of poor appearance and durability due to antistatic agent (conductive agent), and thus such a composition is useful because of its excellent antistatic property.

EXAMPLE

Hereinafter, the present invention will be specifically described with reference to Production Examples and Examples, but the present invention is not limited by these Examples. The parts and percentages in each Example are on a weight basis. Room temperature standing conditions not specified below are all 23° C. and 65% RH.

<Measurement of Weight Average Molecular Weight of (Meth)Acryl-Based Polymer>

The weight average molecular weight (Mw) of the (meth) acryl-based polymer was measured by gel permeation chromatography (GPC).

Analyzer: HLC-8120GPC manufactured by TOSOH CORPORATION
Columns: G7000H$_{xL}$+GMH$_{xL}$+GMH$_{xL}$ manufactured by TOSOH CORPORATION
Column size: each 7.8 mmφ×30 cm, 90 cm in total
Column temperature: 40° C.
Flow rate: 0.8 ml/minute
Injection volume: 100 μl
Eluent: tetrahydrofuran
Detector: differential refractometer (RI)
Standard sample: polystyrene Example 1

(Production of Polarizing Film)

A polyvinyl alcohol film having a thickness of 30 μm was immersed in warm water at 30° C. for 60 seconds, thereby to swell the film. Then, the polyvinyl alcohol film was immersed in an aqueous solution having a concentration of iodine/potassium iodide (weight ratio=0.5/8) of 0.3% and stretched to 3.5 times. Thereafter, in an aqueous boric acid ester solution at 65° C., stretching of the film was performed so that the total stretch ratio becomes 6 times. After stretching, drying was performed in an oven at 40° C. for 3 minutes to obtain a polarizer having a thickness of 12 μm. A saponified triacetyl cellulose (TAC) film with a thickness of 25 μm and a cycloolefin polymer (COP) film with a thickness of 13 μm that was corona-treated were laminated on one side of the polarizer and on the other side, respectively, using a UV curable acrylic adhesive, thereby to prepare a polarizing film.

(Preparation of Acrylic Polymer)

A four-necked flask equipped with a stirring blade, a thermometer, a nitrogen gas inlet tube, and a condenser was charged with a monomer mixture of 80.3 parts of butyl acrylate, 16 parts of phenoxyethyl acrylate, 3 parts of N-vinyl-2-pyrrolidone (NVP), 0.3 parts of acrylic acid, and 0.4 parts of 4-hydroxybutyl acrylate. Further, 0.1 parts of 2,2'-azobisisobutyronitrile as a polymerization initiator together with 100 parts of ethyl acetate, per 100 parts of the monomer mixture (solid content) described above, were added thereto. After nitrogen substitution by introducing nitrogen gas under gentle stirring, a polymerization reaction was carried out for 8 hours while maintaining the liquid temperature in the flask at around 55° C. to prepare a solution of an acrylic polymer having a weight average molecular weight (Mw) of 1.5 million.

(Preparation of Pressure-Sensitive Adhesive Composition)

Using the amount of each component as shown in Table 1, 10 parts of an ionic liquid MPP-TFSI (methylpropylpyrrolidinium bis(trifluoromethanesulfonyl)imide, manufactured by Mitsubishi Materials Electronic Chemicals Co., Ltd.) as a conductive agent (antistatic agent) were blended with 100 parts of the solid content of the acrylic polymer solution obtained above. Further, 0.1 parts of an isocyanate crosslinking agent (D 160N: Takenate D-160N manufactured by Mitsui Chemicals, Inc., trimethylolpropane hexamethylene diisocyanate), 0.3 parts of benzoyl peroxide (BPO:

Niper BMT, manufactured by NOF Corporation), and 0.1 parts of a silane coupling agent (X-41-1810, manufactured by Shin-Etsu Chemical Co., Ltd.,) were added to the above mixture to prepare an acrylic pressure-sensitive adhesive composition solution.

(Preparation of Pressure-Sensitive Adhesive Layer and Polarizing Film Provided with Pressure-Sensitive Adhesive Layer)

Subsequently, the acrylic pressure-sensitive adhesive composition solution was applied to one side of a polyethylene terephthalate film (separator film: MRF 38 manufactured by Mitsubishi Polyester Film Corporation) treated with a silicone-based release agent, so as to have a thickness of 20 μm of the pressure-sensitive adhesive layer after drying. The film was dried at 155° C. for 1 minute to form a pressure-sensitive adhesive layer on the surface of the separator film. The pressure-sensitive adhesive layer was transferred to the polarizing film to prepare a polarizing film provided with a pressure-sensitive adhesive layer.

Examples 2 to 9 and Comparative Examples 1 to 7

In the same manner as in Example 1, a pressure-sensitive adhesive layer was prepared based on the contents of the formulation shown in Table 1, and a polarizing film provided with a pressure-sensitive adhesive layer was prepared using this pressure-sensitive adhesive layer. In Table 1, the blending amounts are all related to the cases of solids or active components of 100%.

The polarizing films provided with a pressure-sensitive adhesive layer, obtained in the above Examples and Comparative Examples, were evaluated as follows. The evaluation results are shown in Table 2.

<Surface Resistance Value (Ω/□): Antistatic Property (Conductivity)>

After peeling off the separator film from the polarizing film provided with a pressure-sensitive adhesive layer, the surface resistance value of the surface of the pressure-sensitive adhesive layer was measured. Measurement was carried out using MCP-HT 450 manufactured by Mitsubishi Chemical Analytech Co., Ltd. The measurement results are shown in Table 2.

<ESD Test>

The polarizing film provided with a pressure-sensitive adhesive layer was cut to 70 mm×120 mm, and then attached to the viewer side of the in-cell type liquid crystal cell after the separator film was peeled off.

Next, a silver paste having a width of 10 mm was applied to the side surface portion of the short side of the laminated polarizing film so as to cover each side surface portion of the polarizing film and the pressure-sensitive adhesive layer and connected to an earth electrode from the outside.

In the case of having an anchor layer, the silver paste was applied so as to cover each side surface portion of the polarizing film, the anchor layer, and the pressure-sensitive adhesive layer.

The liquid crystal display panel was set on a backlight device, and an electrostatic discharge gun was launched onto the polarizing film side on the viewing side at an applied voltage of 9 kV, and the time until the disappearance of the white void portion due to electricity was measured.

Note that the shorter the time until the disappearance of white void is, the better. In the evaluation with this configuration and size, the practical level is 3 seconds or less, preferably 2 seconds or less, more preferably 1 second or less, and still more preferably 0.1 seconds or less.

<Appearance: Initial Stage>

After leaving the obtained polarizing film provided with a pressure-sensitive adhesive layer at room temperature (23° C., 65% Rh) for 1 week, the appearance of the pressure-sensitive adhesive layer was observed visually and with an optical microscope to confirm the presence or absence of precipitates derived from the conductive agent component.

(Evaluation Criteria)

◯: A case in which there are no precipitates and the appearance is good.

x: A case in which precipitates derived from the conductive agent component are confirmed.

<Appearance: After Moist Heat>

The obtained polarizing film provided with a pressure-sensitive adhesive layer was placed in an atmosphere of 60° C. and 95% Rh for 120 hours, taken out at room temperature, and the haze was measured after 10 minutes.

(Evaluation Criteria)

⊙: Haze value of 5 or less; good

◯: Haze value of 5 to 10; no problematic level in practical use x: Haze value of 10 or more; a problematic level in practical use <Durability Test>

A polarizing film provided with a pressure-sensitive adhesive layer cut into a 15-inch size was used as a sample. The sample was stuck to a 0.7 mm thick alkali-free glass (EG-XG, manufactured by Corning Incorporated) using a laminator.

Subsequently, the sample was autoclaved at 50° C. and 0.5 MPa for 15 minutes to completely adhere the sample to the alkali-free glass. The sample subjected to such treatment was treated for 500 hours in an atmosphere of 60° C. and 95% RH, and then the appearance between the polarizing film and the alkali-free glass was visually evaluated based on the following criteria.

(Evaluation Criteria)

◯: There is no change in appearance such as foaming and peeling of the sample.

Δ: Peeling or foaming occurs at the edges of the sample, but there is no problem in practical use except for a special application.

x: Significant peeling is observed at the edges of the sample, and there are problems in practical use.

<Adhering Strength>

The sample was cut to a width of 25 mm×a length of 100 mm, attached to an alkali-free glass plate (EG-XG, manufactured by Corning Incorporated) of 0.7 mm in thickness using a laminator, and then completely stuck by an autoclave treatment at 50° C. and 5 atm for 15 minutes. Thereafter, the adhesive force (N/25 mm) when the sample was peeled off at a peeling angle of 90° C. and a peeling rate of 300 mm/min was measured with a tensile tester (Autograph SHIMAZU AG-1 10KN). The measurement was performed at intervals of one time/0.5 seconds, and the average value was used as the measured value.

TABLE 1

| | Composition of polymer | Obtained polymer Mw | Crosslinking agent Isocyanate-based | Crosslinking agent Peroxide-based | Conductive agent | Silane coupling-agent | Antioxidant |
|---|---|---|---|---|---|---|---|
| Example 1 | BA/PEA/NVP/AA/HBA = 80.3/16/3/0.3/0.4 | 1.5 million | D160N = 0.1 | BPO = 0.3 | MPP-TFSI = 10 | X-41-1810 = 0.1 | |
| Example 2 | BA/PEA/NVP/AA/HBA = 80.3/16/3/0.3/0.4 | 1.5 million | D160N = 0.1 | BPO = 0.3 | EMI-TFSI = 10 | X-41-1810 = 0.1 | |
| Example 3 | BA/PEA/NVP/AA/HBA = 80.3/16/3/0.3/0.4 | 1.5 million | D160N = 0.1 | BPO = 0.3 | MOPy-FSI = 10 | X-41-1810 = 0.1 | |
| Example 4 | BA/PEA/NVP/AA/HBA = 80.3/16/3/0.3/0.4 | 1.5 million | D160N = 0.1 | BPO = 0.3 | EMI-FSI = 10 | X-41-1810 = 0.1 | |
| Example 5 | BA/PEA/NVP/AA/HBA = 80.3/16/3/0.3/0.4 | 1.5 million | D160N = 0.1 | BPO = 0.3 | MPP-TFSI = 13 | X-41-1810 = 0.1 | |
| Example 6 | BA/PEA/NVP/AA/HBA = 80.3/16/3/0.3/0.4 | 1.5 million | D160N = 0.1 | BPO = 0.3 | EMI-FSI = 5 | X-41-1810 = 0.1 | |
| Example 7 | BA/PEA/NVP/AA/HBA = 80.3/16/3/0.3/0.4 | 1.5 million | D160N = 0.1 | BPO = 0.3 | EMI-FSI = 5 | X-41-1810 = 0.1 | Irganox1010 = 0.2 |
| Example 8 | BA/PEA/NVP/AA/HBA = 80.3/16/3/0.3/0.4 | 1.5 million | D160N = 0.1 | BPO = 0.3 | EMI-FSI = 5 | A100 = 0.2 | |
| Example 9 | BA/AA/HBA = 93.9/6/0.1 | 2 million | CL = 0.45 | | MPP-TFSI = 10 | KBM403 = 0.1 | |
| Comparative Example 1 | BA/PEA/AA/HBA = 80.3/16/0.3/0.4 | 1.5 million | D160N = 0.1 | BPO = 0.3 | MPP-TFSI = 10 | A100 = 0.2 | |
| Comparative Example 2 | BA/AA/HBA = 99.3/0.3/0.4 | 1.6 million | D160N = 0.1 | BPO = 0.3 | MPP-TFSI = 10 | A100 = 0.2 | |
| Comparative Example 3 | BA/AA/HBA = 99.3/0.3/0.4 | 1.6 million | D160N = 0.1 | BPO = 0.3 | Li-TFSI = 10 | A100 = 0.2 | |
| Comparative Example 4 | BA/AA/HBA = 99.3/0.3/0.4 | 1.6 million | D160N = 0.1 | BPO = 0.3 | EMP-TFSI = 10 | A100 = 0.2 | |
| Comparative Example 5 | BA/PEA/NVP/AA/HBA = 80.3/16/3/0.3/0.4 | 1.5 million | D160N = 0.1 | BPO = 0.3 | Li-TFSI = 10 | A100 = 0.2 | |
| Comparative Example 6 | BA/PEA/NVP/AA/HBA = 80.3/16/3/0.3/0.4 | 1.5 million | D160N = 0.1 | BPO = 0.3 | EMP-TFSI = 10 | A100 = 0.2 | |
| Comparative Example 7 | BA/AA/HBA = 93.9/1/0.5 | 1.8 million | D160N = 0.1 | BPO = 0.3 | MPP-TFSI = 10 | A100 = 0.2 | |

Abbreviations in Table 1 are as follows.
BA: Butyl acrylate
PEA: Phenoxyethyl acrylate
NVP: N-Vinylpyrrolidone
AA: Acrylic acid
HBA: 4-Hydroxybutyl acrylate
D 160N: Adduct of trimethylol propane with hexamethylene diisocyanate (Takenate D 160N manufactured by Mitsui Chemicals, Inc.), an isocyanate-based crosslinking agent
CL: Adduct of trimethylolpropane with tolylene diisocyanate (Coronate L manufactured by Nippon Polyurethane Industry Co., Ltd.), an isocyanate-based crosslinking agent
BPO: Benzoyl peroxide (NYPER BMT, manufactured by NOF Corporation), a peroxide-based crosslinking agent
MPP-TFSI: Methylpropylpyrrolidinium bis(trifluoromethanesulfonyl)imide (manufactured by Mitsubishi Materials Corporation), an ionic liquid
EMI-TFSI: 1-Ethyl-3-methylimidazolium bis(trifluoromethanesulfonyl)imide (manufactured by Dai-ichi Kogyo Seiyaku Co., Ltd.), an ionic liquid
MOPy-FSI: 1-Octyl-4-methylpyridinium bis(fluorosulfonyl)imide (manufactured by Dai-ichi Kogyo Seiyaku Co., Ltd.), an ionic liquid
EMI-FSI: 1-Ethyl-3-methylimidazolium bis(fluorosulfonyl)imide (manufactured by Daiichi Kogyo Seiyaku Co., Ltd.), an ionic liquid
Li-TFSI: Lithium bis(trifluoromethanesulfonyl)imide (manufactured by Tokyo Chemical Industry Co., Ltd.), an alkali metal salt
EMP-TFSI: 1-Ethyl-1-methylpyrrolidinium bis(trifluoromethanesulfonyl)imide (manufactured by Mitsubishi Materials Corporation), an ionic solid
X-41-1810: Thiol group-containing oligomer type silane coupling agent (manufactured by Shin-Etsu Chemical Co., Ltd.)
A100: Acetoacetyl group-containing silane coupling agent (A-100, manufactured by Soken Chemical & Engineering Co., Ltd.)
KBM 403: Epoxy group-containing silane coupling agent (manufactured by Shin-Etsu Chemical Co., Ltd.)
Irganox 1010: Antioxidant (manufactured by BASF)

TABLE 2

| | Surface resistance value ($\Omega/\square$) | ESD white void | Appearance (precipitation/white turbidity) Initial stage | Appearance (precipitation/white turbidity) Moist heat environment 60° C.*95% RH *after 120 hours | Durability test (foaming/peeling) Moist heat environment 60° C.*95% RH *After 500 hours | Durability test (foaming/peeling) Moist heat environment 85° C.*85% RH *After 500 hours | Adhering strength (N/25 mm) |
|---|---|---|---|---|---|---|---|
| Example 1 | 2.3E+09 | 3 s | ○ | ○ | ○ | ○ | 3.3 |
| Example 2 | 1.0E+09 | 1 s | ○ | ○ | ○ | ○ | 3.1 |

TABLE 2-continued

| | Surface resistance value ($\Omega/\square$) | ESD white void | Appearance (precipitation/white turbidity) | | Durability test (foaming/peeling) | | Adhering strength (N/25 mm) |
|---|---|---|---|---|---|---|---|
| | | | Initial stage | Moist heat environment 60° C.*95% RH *after 120 hours | Moist heat environment 60° C.*95% RH *After 500 hours | Moist heat environment 85° C.*85% RH *After 500 hours | |
| Example 3 | 8.8E+08 | 0.6 s | ○ | ○ | ○ | ○ | 3.8 |
| Example 4 | 4.7E+08 | 0.1 s | ○ | ○ | ○ | ○ | 3.8 |
| Example 5 | 1.0E+09 | 1 s | ○ | ○ | ○ | Slight peeling Δ | 2.8 |
| Example 6 | 1.2E+09 | 1 s | ○ | ⊙ | ○ | ○ | 4.6 |
| Example 7 | 1.2E+09 | 1 s | ○ | ⊙ | ○ | ○ | 4.4 |
| Example 8 | 1.2E+09 | 1 s | ○ | ⊙ | ○ | Slight peeling Δ | 4.1 |
| Example 9 | 3.0E+09 | 3 s | ○ | ○ | ○ | Slight peeling Δ | 4.0 |
| Comparative Example 1 | 3.7E+09 | 4 s | ○ | ○ | Peeling X | Peeling X | 1.7 |
| Comparative Example 2 | 3.6E+09 | 4 s | ○ | ○ | Peeling X | Peeling X | 1.9 |
| Comparative Example 3 | 4.1E+09 | 4 s | ○ | X | Peeling X | Peeling X | 4.0 |
| Comparative Example 4 | 3.2E+09 | 3 s | Precipitation X | ○ | Peeling X | Peeling X | 1.8 |
| Comparative Example 5 | 3.2E+09 | 3 s | ○ | X | ○ | ○ | 6.7 |
| Comparative Example 6 | 2.0E+09 | 2 s | Precipitation X | ○ | Slight peeling Δ | Slight peeling Δ | 4.5 |
| Comparative Example 7 | 3.8E+09 | 4 s | ○ | ○ | Slight peeling Δ | Slight peeling Δ | 3.0 |

From the results of the evaluation in Table 2, it was confirmed that in all the Examples, excellent results can be obtained in all characteristics of antistatic property, appearance characteristic, durability, and adhesive property can be obtained by using a pressure-sensitive adhesive composition comprising an ionic liquid and a (meth)acrylic polymer, as the monomer unit, containing a specific proportion (desired ratio) of a monomer having a specific functional group in all monomers. On the other hand, in Comparative Examples wherein a monomer having a specific functional group was not used at a desired ratio or an ionic solid or an alkali metal salt was used instead of the ionic liquid, such Comparative Examples were inferior in appearance characteristics, durability, and adhesive property.

DESCRIPTION OF REFERENCE SIGNS

1: Surface-treated layer
2: Optical film (polarizing film)
3: Anchor layer
4: Pressure-sensitive adhesive layer
5: Image display panel (In-cell type liquid crystal panel)
6: Conduction structure (Conductive paste)
10: Optical film provided with pressure-sensitive adhesive layer
20: Image display panel (In-cell type liquid crystal panel)

The invention claimed is:

1. A pressure-sensitive adhesive layer for an image display panel formed by a pressure-sensitive adhesive composition for an image display panel, the pressure-sensitive adhesive composition comprising an ionic liquid, a peroxide, and a (meth)acrylic polymer containing, as monomer units, at least two kinds of monomers selected from the group consisting of a carboxyl group-containing monomer, an amino group-containing monomer, and an amide group-containing monomer,
wherein the amount of the at least two kinds of monomers is equal to or more than 1.5% by weight of the total amount of the monomers forming the (meth)acrylic polymer,
wherein the ionic liquid is composed of an organic cation and a fluorine-containing imide anion, and is contained in an amount of 5 to 20 parts by weight per 100 parts by weight of the (meth)acrylic polymer, and
wherein a surface resistance value of the pressure-sensitive adhesive layer is $4\times10^8$ to $1\times10^{10}\Omega/\square$.

2. The pressure-sensitive adhesive layer for an image display panel according to claim 1, wherein the amide group-containing monomer is an N-vinyl group-containing lactam monomer.

3. An optical film provided with a pressure-sensitive adhesive layer, wherein the pressure-sensitive adhesive layer for an image display panel according to claim 1 is formed on at least one side of the optical film.

4. An image display panel, wherein the optical film provided with a pressure-sensitive adhesive layer according to claim 3 is attached to the surface of the image display panel in contact with the pressure-sensitive adhesive layer without an interposed conductive layer.

5. A liquid crystal display device having the image display panel according to claim 4.

6. The pressure-sensitive adhesive layer for an image display panel according to claim 1, wherein the ionic liquid is contained in an amount of 5 to 13 parts by weight per 100 parts by weight of the (meth)acrylic polymer, and
wherein the surface resistance value of the pressure-sensitive adhesive layer is $4\times10^8$ to $3.0\times10^9$ $\Omega/\square$.

* * * * *